US006675980B2

(12) United States Patent
Ehrgott

(10) Patent No.: US 6,675,980 B2
(45) Date of Patent: *Jan. 13, 2004

(54) STORAGE DEVICE MOUNTING SYSTEM

(76) Inventor: Glenn Alan Ehrgott, 7 Spring La., Long Valley, NJ (US) 07853

( * ) Notice: Subject to any disclaimer, the term of this patent is extended or adjusted under 35 U.S.C. 154(b) by 12 days.

This patent is subject to a terminal disclaimer.

(21) Appl. No.: 10/047,561
(22) Filed: Jan. 15, 2002
(65) Prior Publication Data
US 2002/0117464 A1 Aug. 29, 2002

Related U.S. Application Data

(63) Continuation-in-part of application No. 09/303,530, filed on Apr. 30, 1999, now Pat. No. 6,364,141.
(51) Int. Cl.[7] .................................................. A47F 5/00
(52) U.S. Cl. ........................ 211/189; 211/70.6; 211/193; 211/87.01
(58) Field of Search ............................. 211/189, 90.02, 211/90.04, 193, 192, 190, 191, 208, 103, 87.01, 70.6; 248/221.11, 222.11, 323, 339, 340, 302, 303; 410/101, 104, 105, 116, 149, 150

(56) References Cited

U.S. PATENT DOCUMENTS 3,323,186 A * 6/1967 Rennert
3,765,063 A * 10/1973 Farley
5,752,791 A * 5/1998 Ehrlich ........................ 410/101
5,785,475 A * 7/1998 Winstel et al. .......... 410/149 X
5,788,192 A * 8/1998 Poole ..................... 211/193 X
5,807,047 A * 9/1998 Cox ............................ 410/152
5,934,849 A * 8/1999 Haire ...................... 410/101 X
6,364,141 B1 * 4/2002 Ehrgott ........................ 211/189

* cited by examiner

Primary Examiner—Robert W. Gibson, Jr.
(74) Attorney, Agent, or Firm—Steven B. Stein, Esq.

(57) ABSTRACT

The present invention provides a storage device comprising: (a) at least one rigid mounting body comprising: (i) a shaped end of the mounting body portion, capable of supporting a load, (ii) a retention device attachment end of the shaped mounting body portion, (b) a retention device removably attached, to the attachment end of the shaped mounting body portion, the retention device comprising: (i) a cargo control track insert, the insert having upper and lower notches which define at least one adjacent resilient finger which extends beyond the opposing edges of a receiving member receptacle, (ii) a positive engagement latch, movably mounted on the retention device, the positive engagement latch being movable between a notch blocking position and a release position, and (iii) a positive engagement latch operating means, mounted on the retention device, capable of selectively enabling moving said positive engagement latch between the notch blocking position and the release position. The present invention further provides a the storage device in combination with a rectangular receiving member receptacle, capable of stably and reversibly attaching to the provided retention device. Finally, this invention provides a method for storage of implements comprising using the provided storage system.

23 Claims, 14 Drawing Sheets

FIGURE 11
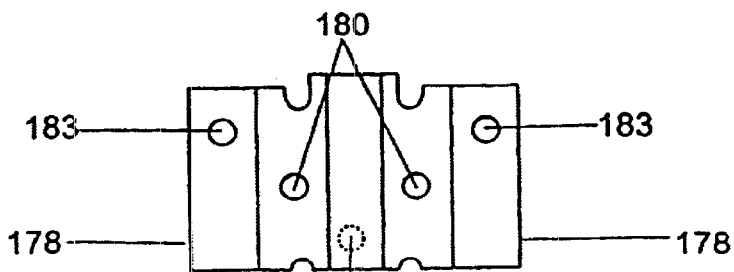
FIGURE 11 A
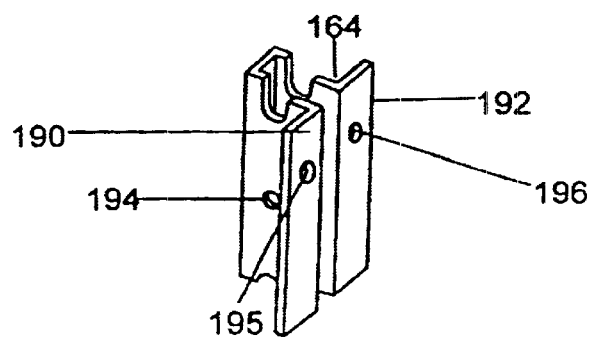
FIGURE 11 B
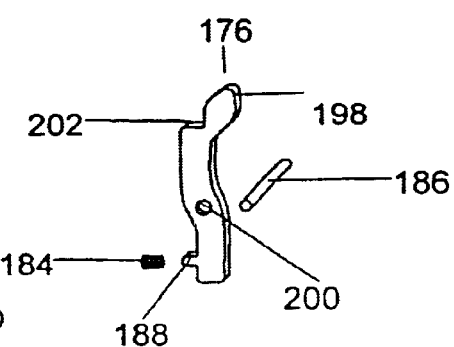
FIGURE 11 C
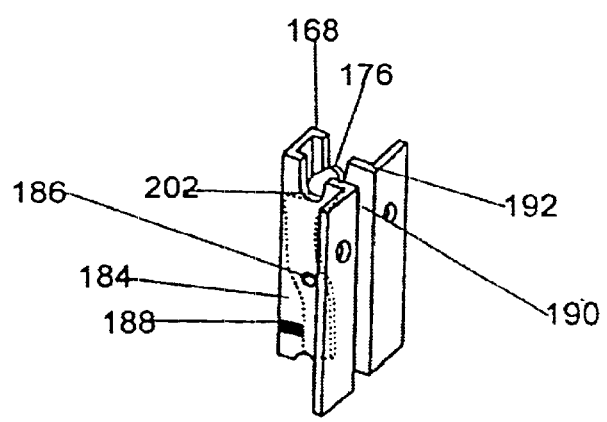
FIGURE 11 D FIGURE 12
FIGURE 12 A
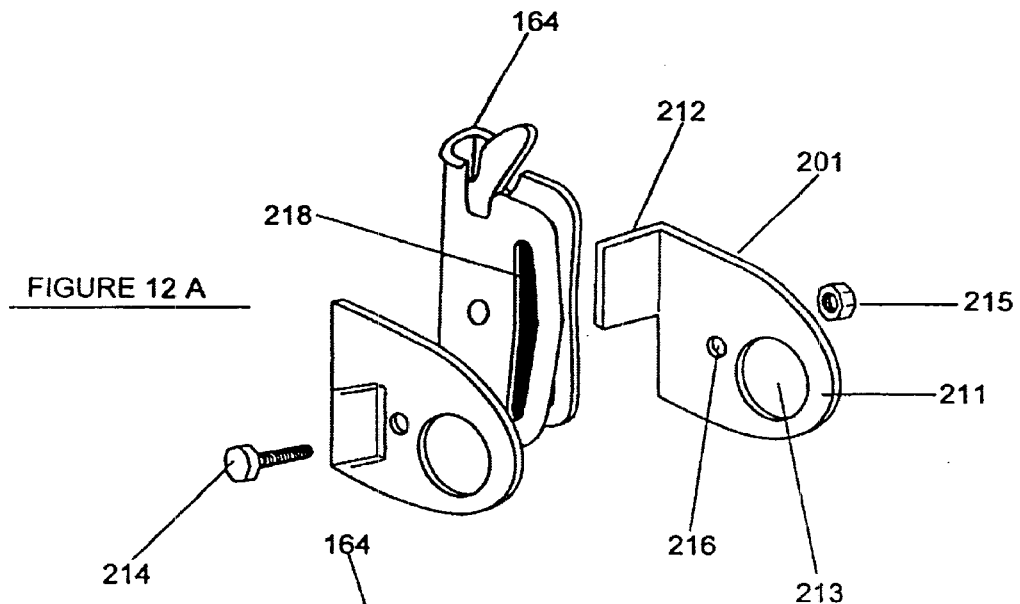
FIGURE 12 B
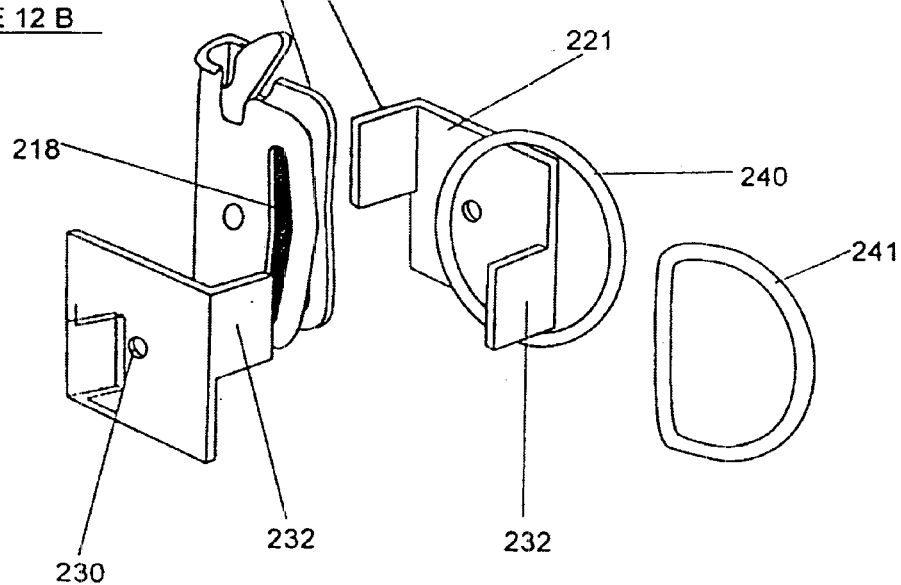

FIGURE 13
FIGURE 13 A
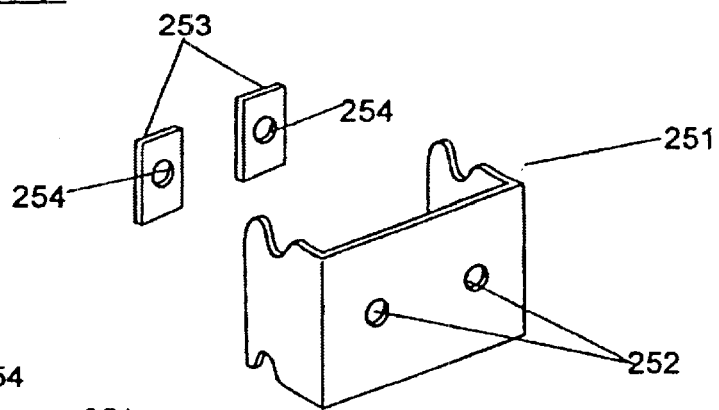
FIGURE 13 B
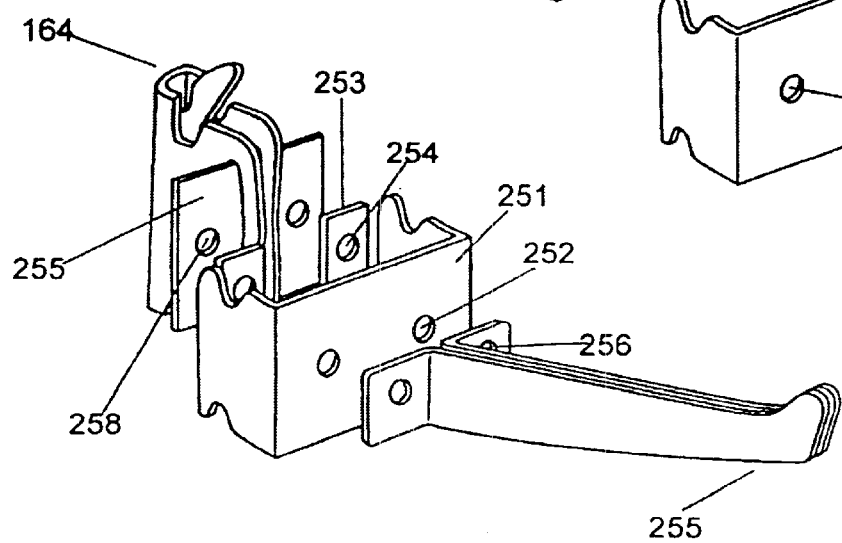

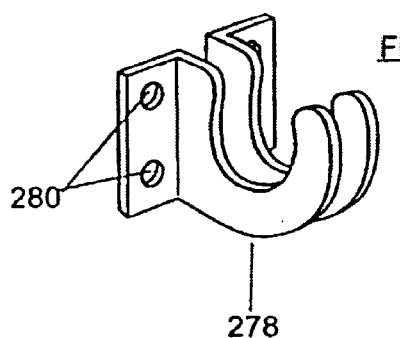
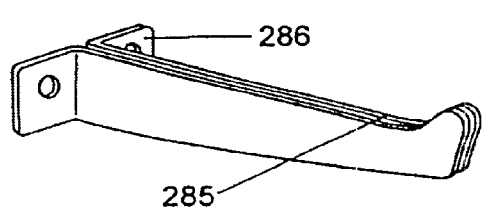
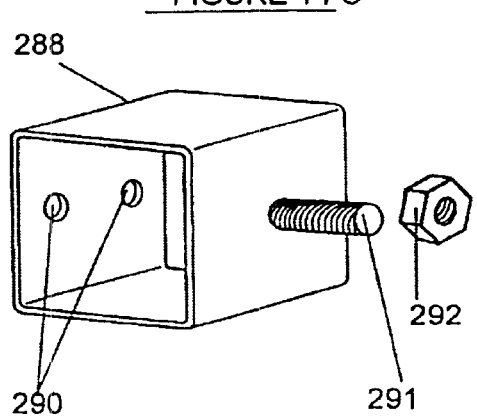
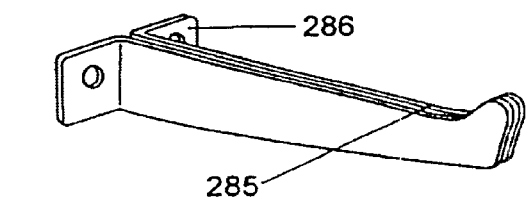
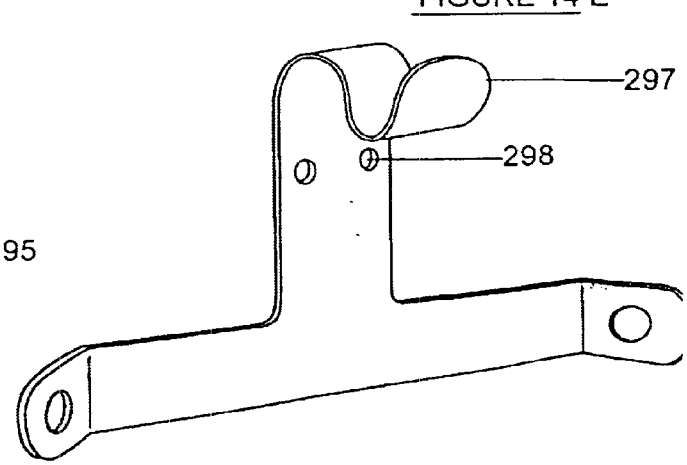

FIGURE 15
FIGURE 15 A
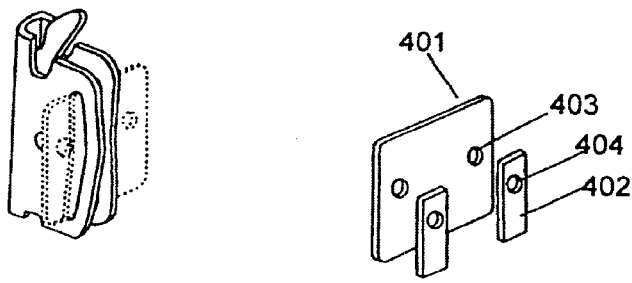
FIGURE 15 B
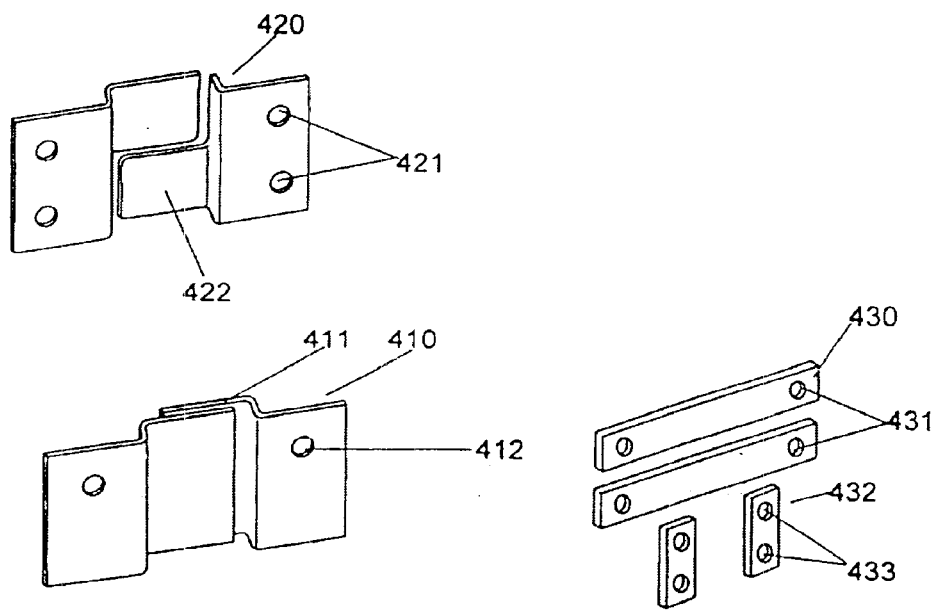

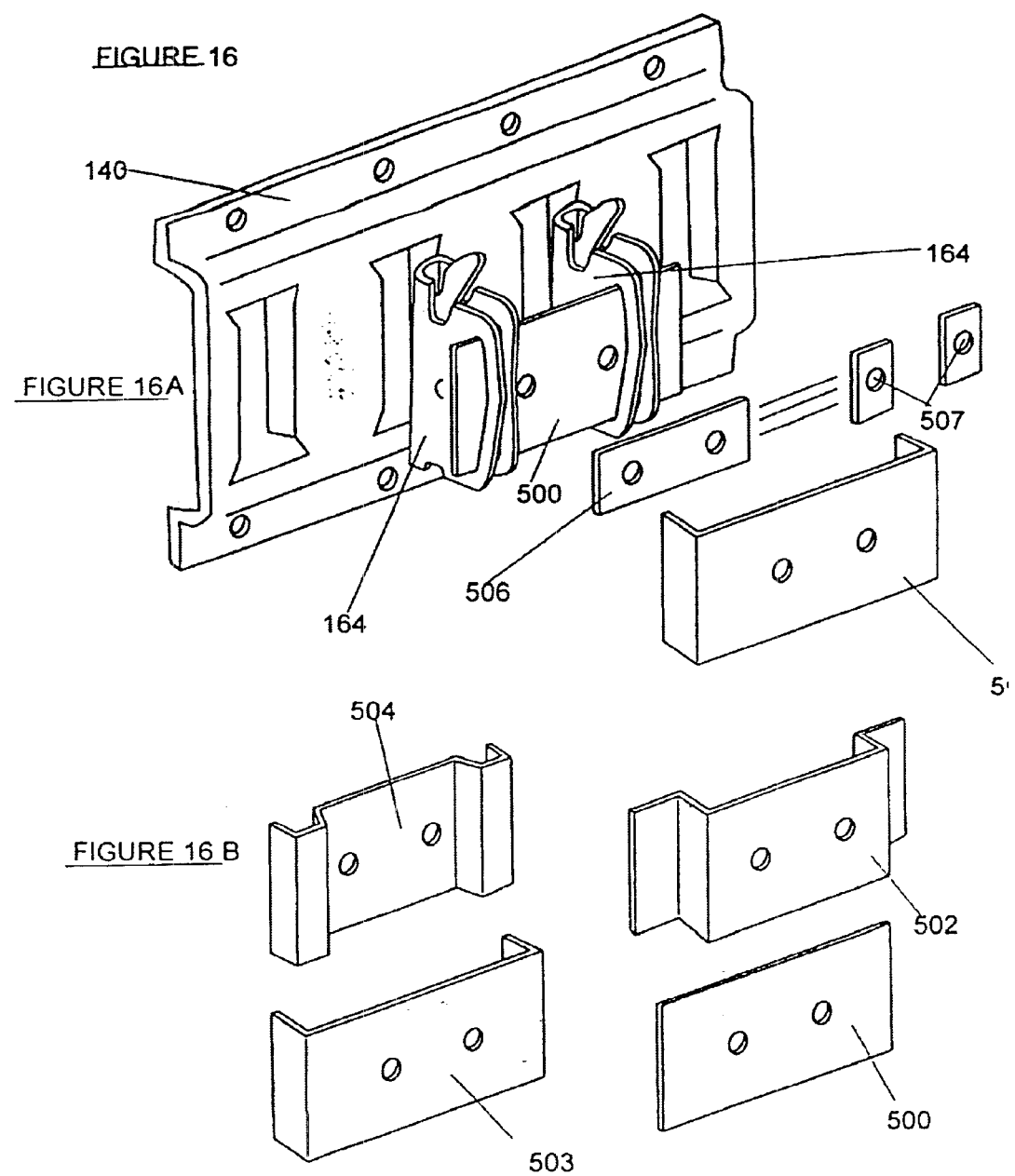

STORAGE DEVICE MOUNTING SYSTEM

The present application is a continuation-in-part of and claims priority to U.S. application, Ser. No. 09/303,530, filed on Apr. 15, 1999 now U.S. Pat. No. 6,364,141 which is hereby incorporated by reference in its entirety.

FIELD OF THE INVENTION

The present invention relates to a storage device mounting system and more particularly to a storage system, which is adjustable. The storage system comprises shelving support structures, which are capable of supporting loads of various shapes and sizes. More specifically, the provided storage system is capable of supporting a cantilever load or tension load. The present invention provides a storage system, which can be used more safely in a plurality of environments than the prior art.

BACKGROUND OF THE INVENTION

Wall-based and free-standing storage units are well known in the art. Such units are either individually secured to a wall or cooperate with a dedicated rail, slot, or channel or are used with a pegboard or slat wall arrangement. (See U.S. Pat. Nos. 4,318,486; 4,723,663; 4,982,922; 4,867,623; 4,852,747; 5,224,609; 5,265,992; 5,322,256; 5,740,927; 5,807,047 and; 5,839,589). Such arrangement may utilize horizontal bars or rails on which brackets or hooks are mounted in order to support various items. Storage units have been described having hooks permanently attached to specified points on a bar. Other storage systems describe sliding brackets captured on a rail. Additionally, other storage systems provide a changeable, slidable bracket utilizing an open-ended fastener at the back of the bracket which is slipped over the top of the rail. See, U.S. Pat. No. 3,260,489. Further systems employ brackets with fasteners which are trapped on a rail (See, U.S. Pat. Nos. 2,291,966 and 2,546,720). Further still, storage systems have been described which provide wall systems which are readily adjustable to differently shaped loads capable of supporting heavy loads. (See, U.S. Pat. No. 4,318,486). Such systems provide a mounting rail carrying brackets with U-shaped fastener sections which grip the rail but which can be slipped off at one or more grooves in the rail. The wall based systems described herein above limit the type of devices that can be stored. The slidable variety of the systems limit the number of brackets or limit the changing of brackets after the rail or equivalent has been mounted. Importantly, in a mobile environment, brackets could slide in alignment with an open groove and become dislodged or cause stored materials to collide with one another. Other disclosures have provided storage systems and fittings to be employed with a track member wherein the fitting has a positive pivotal retainer means that may be easily operated for locking and unlocking the fitting relative to the track. Such systems provide a secure fitting of cargo for transportation.

Anchor fittings have also been described. Such fittings provide for removably attaching objects to the floor or wall of a vehicle. Such fittings may be operate in conjunction with a track attached to a vehicle floor with the track having alternate notch and neck proportions which matingly engage the fittings. (See, U.S. Pat. Nos. 2,6888,504; 4,033,268; 4,230,432; 4,256,424; 4,708,549; and 5,265,992). Such devices limit use to either a beam supported at both ends, a strap, or an anchor ring type device or opening which cooperates with common cargo control device such as a ratchet strap or load binder.

The prior art also describes fittings, which has a positive pivotal retainer means that may be easily operated for locking and unlocking the fitting relative to openings provided in conjunction with cargo control track. Such fittings provide for removably attaching objects to the floor or wall of a vehicle. Such fittings operate in conjunction with openings provided in cargo control track attached to the floor, walls or ceiling of a vehicle, or other rigid support structure, such as a building, fence, or shed. The prior art devices limit use to either a beam supported at both ends, with insertion member ends attached pivotally, and directly to an insertion member, or attachment of the secondary device is through sewn in non rigid, fabric or woven material. The prior art describes devices limited to either a beam supported at both ends, a strap, or an anchor ring type device or opening which cooperates with a common cargo control device such as a ratchet strap, or load binder The direct support of objects to be stored, and resulting cantilever, or tension loads are described in U.S. Pat. Ser. No. 09/303,530.

The present invention provides distinct advantages over the prior art and solves numerous problems long-described and understood in the field.

SUMMARY OF THE INVENTION

It is therefore an object of this invention to provide a storage device support member, comprising: (a) at least one rigid mounting body comprising: (i) a shaped end of the mounting body portion, capable of supporting a load, (ii) a retention device attachment end of the shaped mounting body portion, (b) a retention device removably attached, to the attachment end of the shaped mounting body portion, the retention device comprising: (i) a cargo control track insert, the insert having upper and lower notches which define at least one adjacent resilient finger which extends beyond the opposing edges of a receiving member receptacle, (ii) a positive engagement latch, movably mounted on the retention device, the positive engagement latch being movable between a notch blocking position and a release position, and (iii) a positive engagement latch operating means, mounted on the retention device, capable of selectively enabling moving said positive engagement latch between the notch blocking position and the release position.

More specifically, it is an object of this invention to provide a storage device support member in combination with a rectangular receiving member receptacle, capable of stably and reversibly attaching to the provided storage device.

Finally, it is an object of this invention to provide a method for storage of implements comprising using the provided storage system.

BRIEF DESCRIPTION OF THE FIGURES

FIG. 11A. Detail showing a rigid mounting body profiles 178 formed in one piece of stamped metal, including holes 180 through which a retaining rivet or other fastener may be inserted.

FIG. 11B. Detail showing a formed rigid mounting body bent into a shape whereby the outer measurement snugly fits into the receiving member receptacle, the end of which forms a retention device 164 (See, FIG. 7). A positive retention latching device 176 (See FIG. 11C) is capable of being inserted between the parallel planar surfaces 190 and 192. Holes 194 and 196 when in alignment enable insertion of a rivet pin therethrough.

FIG. 11C. A latch profile 176, including a finger actuated tab 198, a hole 200 which is slightly larger in diameter than a rivet 186, and a spring tab 188 which holds a spring 184, and at proper length acts as a pivotal motion limit.

FIG. 11D. Latch profile 176 inserted between parallel planar surfaces 190 and 192 with spring 184 retained on spring tab 188 and held in place with rivet 186. The height of surface 202 is disposed in proximity as to cause an interference in upper notch 168 (See, FIG. 7) by the action of spring 184 thereby preventing removal of the retention device from the receiving member receptacle 142 (See FIG. 10).

FIG. 12A. Rigid mounting body portion 201 with tab 212 capable of inserting through a slot 218 transecting the retention device 164. The rigid mounting body portion has a shaped end 211 with a circular aperture 213 suitable for attaching and securing a load. A first rigid mounting body portion is attachable to a second rigid mounting body portion by a fastening means such as a bolt 214 passing through an alignable aperture 216 in each rigid mounting body portion and fixed on the opposite side by a securing means such as a nut 215.

FIG. 12B. Rigid mounting body portion 221 with tab 222 capable of inserting through a slot 218 transecting the retention device 164. The rigid mounting body portion has a tab shaped end 232 capable of creating a closure when joined with a second so-shaped rigid mounting body portion, which is identical but in the opposite orientation. A ring 240 or D-loop 241 or other attachment unit may be inserted around the tab shaped end 232 so as to provide a suitable attaching means for securing a load. The first rigid mounting body portion is attachable to a second rigid mounting body portion by a fastening means such as a bolt passing through an alignable aperture 230 in each rigid mounting body portion and fixed on the opposite side by a securing means such as a nut.

FIG. 16A. Rigid mounting body portion inserted through more than one retaining device.

FIG. 16B. Various shaped rigid mounting body portions suitable for attachment as a second rigid mounting body portions to a first rigid mounting body portion

DETAILED DESCRIPTION OF THE INVENTION

Figure 1:
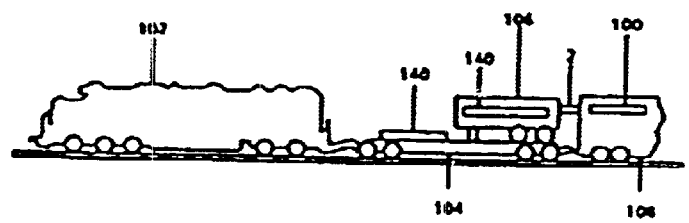
FIG. 1. Cargo Control Track. Cargo Control Track 140 is shown installed in various common vehicles such as on the floor of a flatbed rail car 104, on the walls of a tractor trailer cargo trailer 106, and on the walls of a railroad boxcar 108.

The present invention provides a storage device comprising: (a) at least one rigid mounting body comprising: (i) a shaped end of the mounting body portion, capable of supporting a load, (ii) a retention device attachment end of the mounting body portion, (b) a retention device removably attached, to the attachment end of the mounting body portion, the retention device comprising: (i) a cargo control track insert, the insert having upper and lower notches which define at least one adjacent resilient finger which extends beyond the opposing edges of a receiving member receptacle, (ii) a positive engagement latch, movably mounted on the retention device, the positive engagement latch being movable between a notch blocking position and a release position, and (iii) a positive engagement latch operating means, mounted on the retention device, capable of selectively enabling moving said positive engagement latch between the notch blocking position and the release position.

According to one embodiment of the present invention, the mounting body portion further comprises an integral insertion tab, capable of insertion through the cargo control track insert. Another embodiment of the present invention, is the provided storage device support member further comprising a second mounting body portion, the second mounting body portion being attached to the first mounting body portion by means of a fastening device. Yet another embodiment of the present invention is the provided storage device support member, wherein the fastening device is one selected from the group containing (bolt, rivet, screw, dowel and pin). Yet another embodiment of the present invention further comprises at least one spacer. Another embodiment of the present invention further comprises a load bearing arm. According to an embodiment of this invention, the load bearing arm is attached to the rigid mounting body by a fastener means. According to a preferred embodiment of this invention, the load bearing arm is a bracket. According to another preferred embodiment of this invention, the load bearing arm is a ring. According to still another preferred embodiment of this invention, the load bearing arm is a hook. Still another embodiment of the present invention is the provided storage device support member, further comprising an attachment ring. According to one embodiment of this invention, the attachment ring is removable. Further, according to another embodiment of the present invention, the the shaped mounting body comprises a two pronged hook shape capable of supporting a load. Still further, according to another embodiment of the present invention, the shaped mounting body further comprises an elongated shaped end in a horizontal orientation, capable of supporting a cantilevered load. According to a further embodiment of the present invention, the shaped mounting body comprises a one pronged singular hook shape. Even further still, according to another embodiment of the present invention, the shaped mounting body comprises a linear shape capable of supporting a shelf bracket. Still even further, according to another embodiment of the present invention, the retention device is attached to an overhead cargo control track and the shaped mounting body portion is in a vertical orientation, capable of exerting a tension load . According to yet still another further embodiment of the present invention, the shaped mounting body portion is in a shape capable of engaging and supporting a rim mounted tire. According to even yet still another further embodiment of the present invention, the shaped mounting body portion is a stationary rigid loop. According to another embodiment of the present invention, the shaped mounting body portion is a ring. Yet another embodiment of the present invention provides the storage device support member wherein the shaped mounting body portion is a straight rod. Still another embodiment of the present invention provides the storage device support member wherein the shaped mounting body portion is a flat plate. Yet according to still another embodiment of the present invention, is the provided storage device support member further comprising stabilizing tabs that extend perpendicularly to the control track insert, capable of limiting pivotal movement relative to the cargo control track. Still another embodiment of the present invention provides the storage device in combination with a rectangular receiving member receptacle, capable of stably and reversibly attaching to the provided retention device. Finally, the present invention provides a method for storage of implements comprising using the provided storage system.

In one embodiment of the present invention, the retention device portion comprises one or more notches which define one or more resilient fingers, the notch formed to snugly fit into the receiving member receptacle. According to an embodiment of this invention the retention device portion comprises an upper notch and an opposing lower notch. According to an embodiment of this invention, the distance between the resilient fingers adjacent the upper notch and the resilient fingers adjacent the opposing lower notch is greater than the distance between the opposing end edges defining the receiving member receptacle.

According to another embodiment of the present invention, the retention device portion comprises one or more resilient fingers positioned so as to contact and engage an opposing end edge of the receiving member receptacle. According to an embodiment of this invention, the retention device portion further comprises one or more notches which define one or more resilient fingers adjacent to the notch and positioned so as to contact and engage an opposing end edge of the receiving member receptacle. According to still another embodiment of this invention, the upper notch is larger than the lower notch.

According to a further embodiment of the present invention, the retention device portion further comprises a latching device capable of interfering with one of the opposing end edges of the receiving member receptacle. According to an embodiment of this invention, the latching device is movable with respect to the retention device portion. The latch may pivot, tilt, turn or slide. According to still another embodiment of this invention, the latching device comprises a mechanically actuated lever. According to still another embodiment of this invention, the mechanically actuated lever is actuated by compressing a resilient material. According to an embodiment of this invention, the resilient material is a spring. According to yet still another embodiment of the present invention, the latching device is disposed within the notch. According to an embodiment of the invention, the latching device or a portion thereof pivots with respect to the retention device portion. According to still yet another embodiment, of the present invention, the latching device or a portion thereof slides with respect to the retention device portion. Yet further, according to another embodiment of the present invention, the latching device is disposed between the resilient fingers and positioned so as to contact and engage an opposing end edge of the receiving member receptacle.

According to yet another embodiment of the present invention, a plurality of receiving member receptacles are linearly positioned along the receiving member. According to one embodiment of this invention, receiving member receptacle is rectangular in shape. In another embodiment the receiving member receptacle is square in shape. In yet another embodiment the receiving member receptacle is oblong in shape. In still another embodiment, the receiving member receptacle is ovoid in shape. In still yet another embodiment the receiving member receptacle is about circular in shape. In a further still embodiment, the receiving member receptacle is irregular in shape. It is contemplated that the receiving member receptacle may be of a variety of shapes and sizes and depths and widths and lengths. In a preferred embodiment, the receiving member receptacle is rectangular.

According to a further embodiment of the present invention, the receiving member is formed from one of the group consisting of (metal, wood and plastic). It is contemplated that the receiving member may be fashioned from a variety of materials. In a preferred embodiment, the receiving member is metal. In a more preferred embodiment, the receiving member is formed from aluminum or steel. It is further contemplated that the receiving member may be light in weight while still retaining capacity to bear a significant cantilever weight load. According to a still further embodiment of the present invention, the receiving member is capable of being removably mounted on a fixed surface.

According to a yet still further embodiment of the present invention, the mounting body portion of the insertion member is elongated. According to one embodiment of the present invention, the mounting body portion of the insertion member is selected from the group consisting of a hook, a ring a pronged implement holder and a bracket. It is contemplated that the body portion of the insertion member is capable of bearing a significant cantilever weight load. It is further contemplated that the body portion of the insertion member is capable of stably retaining a variety of implements including but not limited to tools, lumber, beams, girders, wire and lines.

According to a yet still further embodiment of the present invention, the load bearing arm is elongated. According to one embodiment of the present invention, the load bearing arm is selected from the group consisting of a hook, a ring a pronged implement holder and a bracket. It is contemplated that the load bearing arm is capable of bearing a significant cantilever weight load. It is further contemplated that the load bearing arm is capable of stably retaining a variety of implements including but not limited to tools, lumber, beams, girders, wire and lines.

Further still, the present invention provides a free standing storage system. Yet further still, the present invention provides a storage system mounted to a fixed surface. According to an embodiment of this invention, the storage system is easily disassembled. According to another embodiment of this invention, the storage system is adjustable in height, length, density and spacing. According to still another embodiment of the present invention, the orientation of the receiving member is horizontal, vertical or diagonal.

Additionally, the present invention provides the rigid mounting body portion of the provided storage system. Also, the present invention provides the load bearing arm of the provided storage system.

Finally, the present invention provides a method for storage of implements comprising using the provided storage system.

The present invention may be practiced using common cargo control track. Such track is exemplified by but not limited to track known in the art as "E-track" or "A-track." Such track is a basis of providing horizontal and vertical track sections, as well as individual brackets with one or more receiving member receptacles. The track can be fastened to walls, ceilings, floors, or other fixed surfaces. Alternatively, the track may be fixed to or as free-standing support structures in order to provide a series of receiving member receptacles in which to engage insertion members as storage supports. Such a practice enables the user to hold various implements including, but not limited to shovels, rakes, pick axes, hammers, electrical extension cords, bicycles, spare tires, skis, shelves, emergency equipment and hoses. It is contemplated that the track or receiving member is fastened to an interior of an emergency vehicle. It is further contemplated that the track is fastened to the outside of such a vehicle or other type of mobile structure. The receiving member or its components and accessory devices may be color-coded. Such color coding facilitates rapid assembly of the system. Alternatively, emergency colors such as florescent yellow or orange or red provides indication of various emergency equipment. In another alternative example, color coding may indicate compatibility between various stored implements such as in an technical, medical, pharmaceutical, electrical or plumbing application. Moreover, in a technical setting or a medical setting, such color coding provides indication of compatible equipment, reagents, therapeutics or a particular sequence of use thereof.

A retention device is provided with the various storage support devices which allows them to be added or removed from the mounting track individually with or without tools, and without requiring the removal of adjacent support devices, providing ease of use and accommodating a number of combination of implements. Provision for a positive retention in the form of a latching device is also provided. Positive retention of insertion member support devices eliminates accidental dislodging thereby facilitating use in a wide variety of environments. Mobile environments, in particular are enabled by the positive retention latching device. Moreover, positive retention latches are not easily dislodged through motion and impact which is often associated with the removal and replacement of stored items. This makes the storage system of the present invention safer to use. The storage system of the present invention provides for the display of a number of different shaped and weighted items in a plurality of environments and settings.

As used herein, the term "cantilever" means a projecting beam, girder, post, pole, platform or other structure supported only at one end. As used herein, the term "pivot" means the rotation, swinging or shifting of a short rod, shaft or other member about a related part or member. As used herein, the term "receptacle" refers to an opening, space, groove, slot or hole capable of accepting by insertion another member or part. As used herein, the term "implement" means a tool, device or other utensil including, but not limited to a shovel, a rake, an axe, a spare tire, a cord, a wire, a hammer, a shelf, a hose and a jack.

Figure 2:
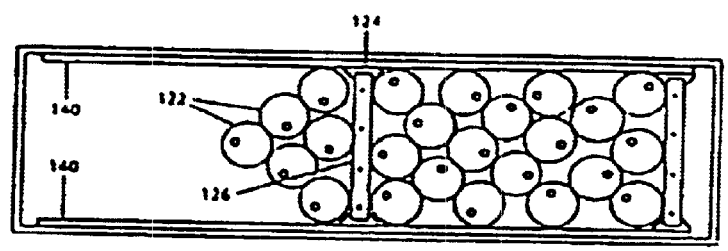
FIG. 2. Top Plan of the Trailer of FIG. 1. Top cutaway view inside the tractor trailer along reference line 2 of FIG. 1. This exemplifies a typical application of cargo control track 140 used to brace heavy cargo 122 from moving using cargo control pockets 124 and cargo control beams supported at both ends 126.
Figure 3:
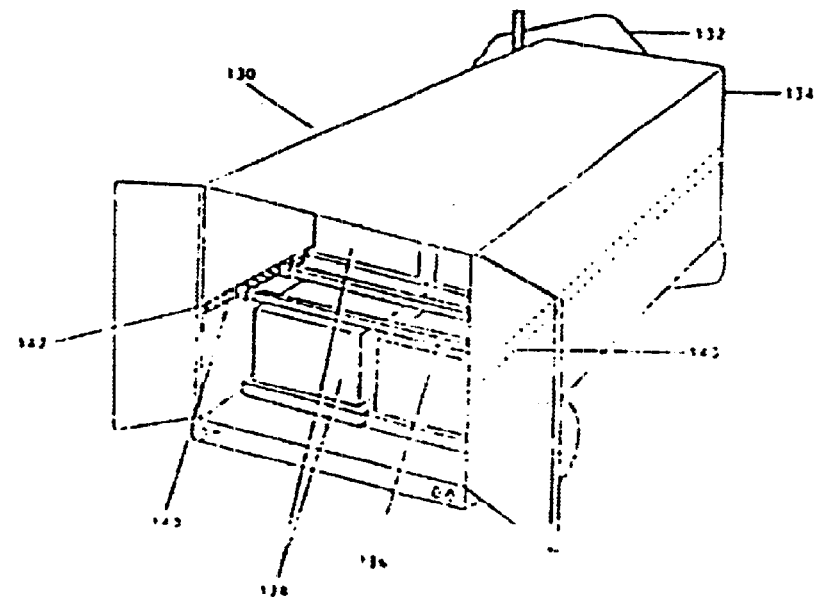
FIG. 3. Use of cargo control tracks 140 to support cargo control beams 136 in cargo control track receiving member receptacles 142 to support palletized cargo 138 inside a trailer 134 pulled by a truck 132 in a typical tractor trailer combination 130.
Figure 4:
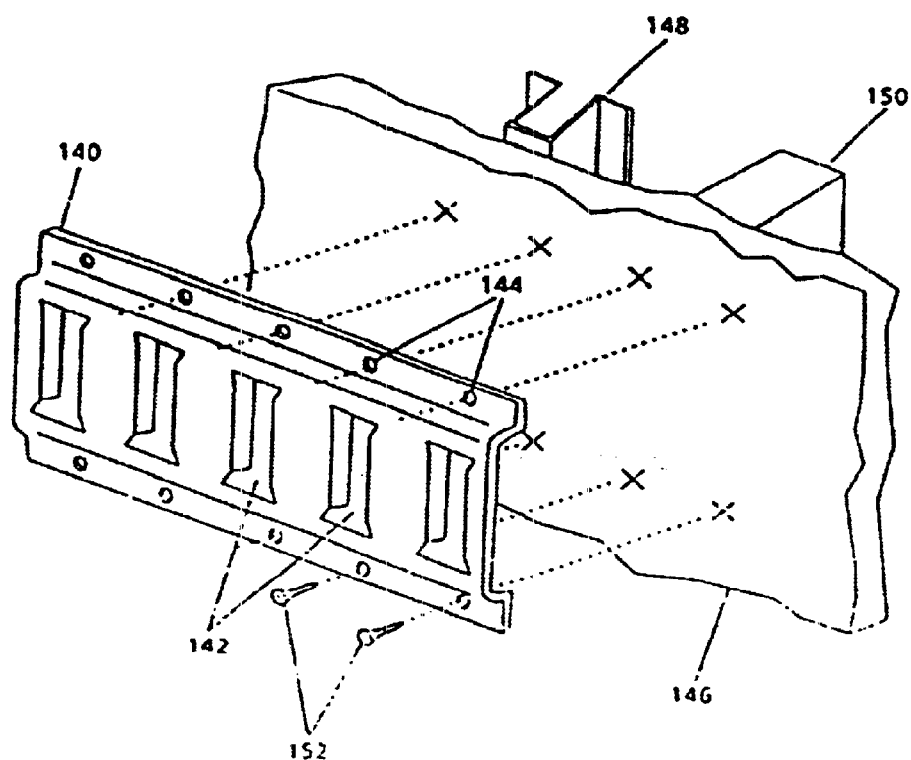
FIG. 4. Cargo control track 140 mounted to a planar surface 146 through the use of screws 152 placed through mounting holes 144. As alternatives to screws, a variety of fastening methods is contemplated including but not limited to bolts, welding, riveting, expansion anchors, and adhesives. The cargo control track may also be directly connected to another singular or multiple support member(s) such as a steel hat section 148 or wooden stud 150.

Referring now to the figures: The Cargo Control Track referred to as the "receiving member" of the provided storage system is shown in FIG. 1. Cargo Control Track 140 is shown installed in various common vehicles such as on the floor of a flatbed rail car 104, on the walls of a tractor-trailer cargo trailer 106, and on the walls of a railroad boxcar 108. FIG. 2 shows the top plan of the trailer of FIG. 1. The top cutaway view inside the tractor-trailer is shown along reference line 2 of FIG. 1. This exemplifies a typical application of cargo control track 140 used to brace heavy cargo 122 from moving using cargo control pockets 124 and cargo control beams supported at both ends 126. FIG. 3 depicts the use of cargo control tracks 140 to support cargo control beams 136 in cargo control track receiving member receptacles 142 to support palletized cargo 138 inside a trailer 134 pulled by a truck 132 in a typical tractor trailer combination 130. FIG. 4 presents cargo control track 140 mounted to a planar surface 146 through the use of screws 152 placed through mounting holes 144. As alternatives to screws, a variety of fastening methods is contemplated including but not limited to bolts, welding, riveting, expansion anchors, and adhesives. The cargo control track may also be directly connected to another singular or multiple support member(s) such as a steel hat section 148 or wooden stud 150. In another embodiment of this invention, the track may be formulated as a free-standing structure. An example of a free-standing structure is a table. The present invention contemplates a variety of free-standing structures including, but not limited to a table, a bench, a bookcase and a cabinet. Moreover, the present invention further contemplates a free-standing structure comprising wheels. An example of such a formulation is a cart.

Figure 5:
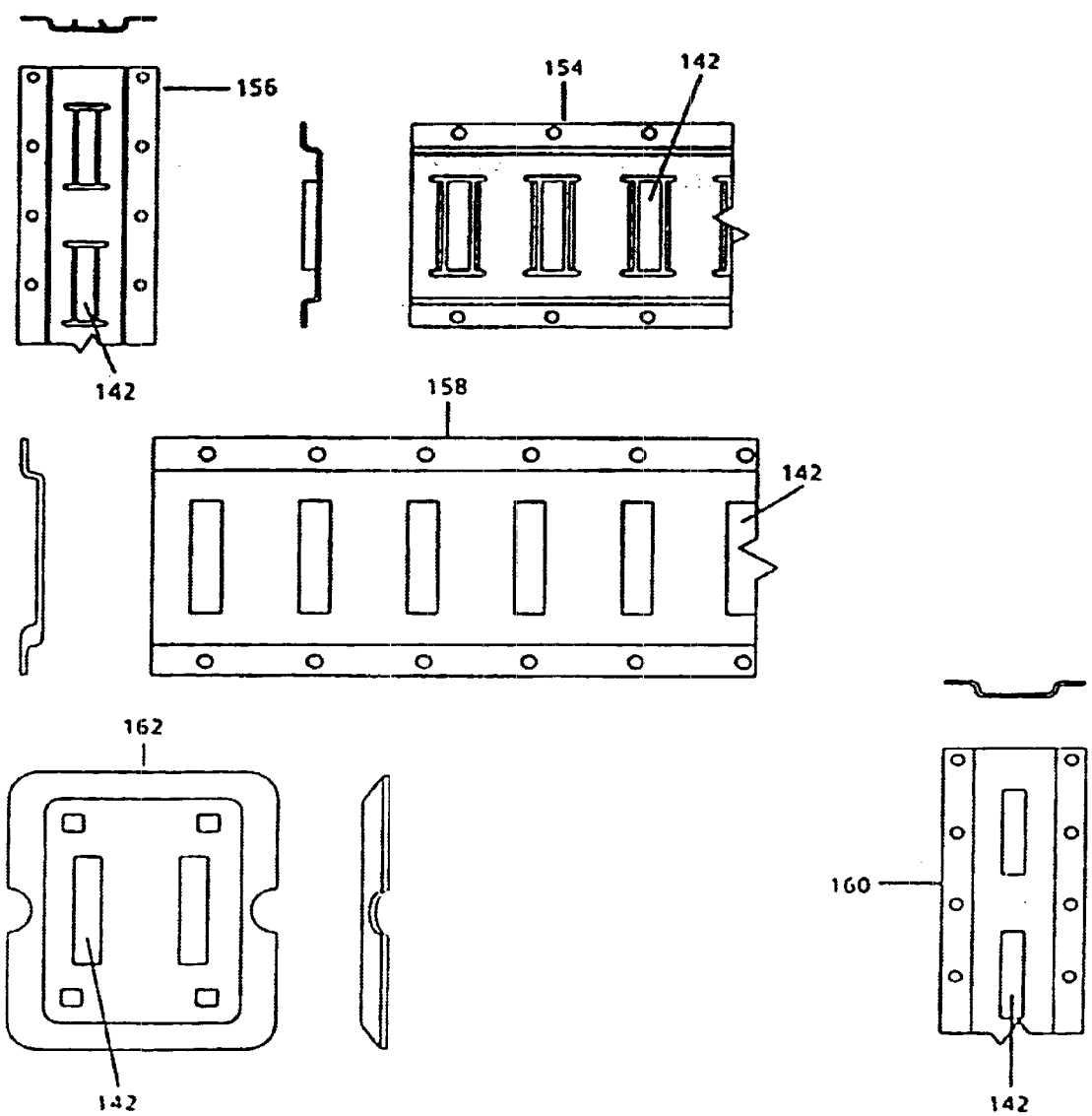
FIG. 5. Track sections including horizontal E-track 154, vertical E-track 156, horizontal A-track 158, vertical A-track 160, and series A-track 162. Such typical configurations are readily available and are used to provide one or more receiving member receptacles 142.

FIG. 5 depicts track sections including horizontal E-track 154, vertical E-track 156, horizontal A-track 158, vertical A-track 160, and series A-track 162. Such typical configurations are readily available and are used to provide one or more receiving member receptacles 142.

Figure 6:
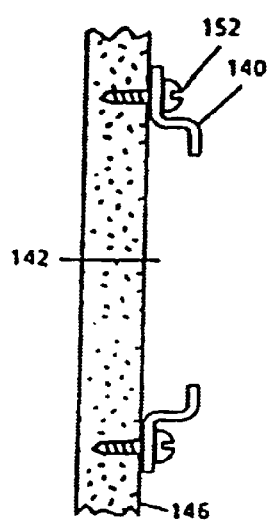
FIG. 6. Cross sectional view of a receiving member receptacle 142 in cargo control track 140, a fastener 152 and a cutaway view of cargo control track 140 attached to a supporting surface 146.
Figure 7:
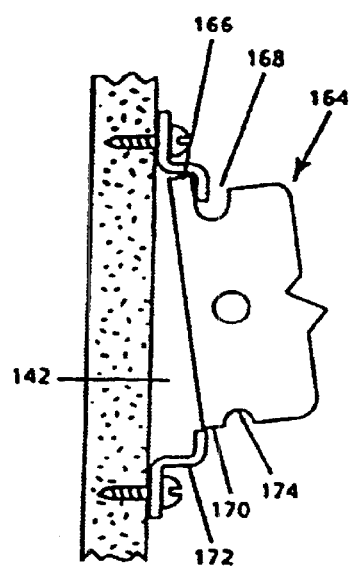
FIG. 7. Typical retention device 164 comprising an upper resilient finger 166 adjacent to an upper notch 168 enabling lifting retention device 164 while inserting upper finger 166 high enough to allow lower resilient finger 170 to clear the lower opposing end edge 172 of the receiving member receptacle 142 and be lowered.
Figure 8:
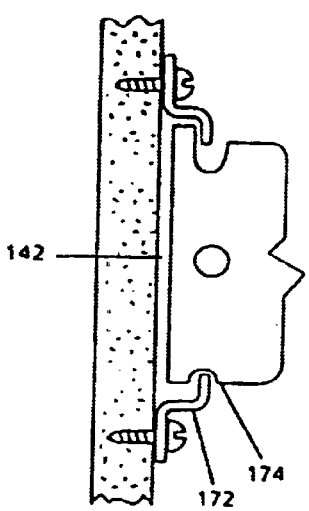
FIG. 8. Lower notch 174 engages the lower opposing end edge 172 of the receiving member receptacle 142. To remove the retention device, the retention device 164 is lifted, tipped tilted or pivoted and lowered from the receiving member receptacle.
Figure 9:
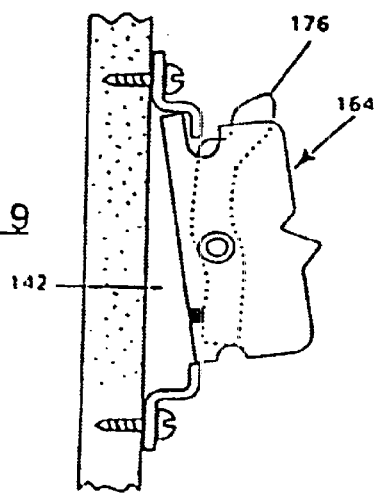
FIG. 9. Engagement of the retention device in a receiving member receptacle as in FIG. 8 adding a positive engagement latch 176 pulled back to enable lifting retention device 164 into the receiving member receptacle 142.
Figure 10:
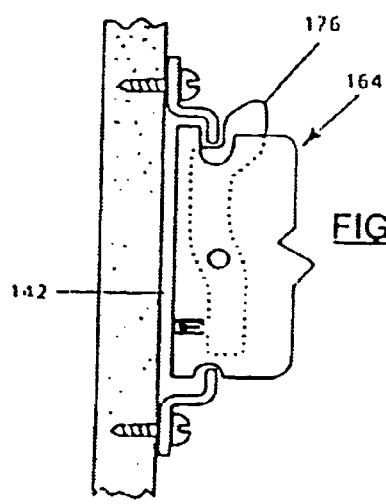
FIG. 10. The positive engagement latch 176 engaged in a position that restricts motion of the retention device thereby preventing its removal from the receiving member receptacle 142. To remove the fitting, positive engagement latch 176 is pulled back away from the receiving member receptacle 142, thereby enabling sufficient motion of the retention device 164 thereby enabling removal from the receiving member receptacle 142.

FIG. 6 exhibits a cross sectional view of a receiving member receptacle 142 in cargo control track 140, the cargo control track, a fastener 152, a cutaway view of cargo control track 140 attached to a supporting surface 146. FIG. 7 describes a typical retention device 164 comprising an upper resilient finger 166 adjacent to an upper notch 168 enabling lifting retention end 164 while inserting upper finger 166 high enough to allow lower resilient finger 170 to clear the lower opposing end edge 172 of the receiving member receptacle 142 and be lowered. The lower notch 174 of FIG. 8 engages the lower opposing end edge 172 of the receiving member receptacle 142. To remove the retention device, the retention device 164 is lifted, tipped or tilted and lowered from the receiving member receptacle. FIG. 9 describes engagement of the retention device in a receiving member receptacle as in FIG. 8 adding a positive engagement latch 176 pulled back to enable lifting retention device 164 into the receiving member receptacle. FIG. 10 exemplifies the positive engagement latch 176 engaged in a position that restricts motion of the retention device thereby preventing its removal from the receiving member receptacle 142. To remove the fitting, positive engagement latch 176 is pulled back, enabling sufficient motion of the retention device 164 thereby enabling removal from the receiving member receptacle 142.

FIG. 11A is a detail showing a rigid mounting body profiles 178 formed in one piece of stamped metal, including holes 180 through which a retaining rivet or other fastener may be inserted. Figure is a detail showing a formed rigid mounting body bent into a shape whereby the outer measurement snugly fits into the receiving member receptacle, the end of which forms a retention device 164 (See, FIG. 7). A positive retention latching device 176 (See FIG. 11C) is capable of being inserted between the parallel planar surfaces 190 and 192. Holes 194 and 196 when in alignment enable insertion of a rivet pin therethrough. FIG. 11C shows a latch profile 176, including a finger actuated tab 198, a hole 200 which is slightly larger in diameter than a rivet 186, and a spring tab 188 which holds a spring 184, and at proper length acts as a pivotal motion limit. FIG. 11D shows a latch profile 176 inserted between parallel planar surfaces 190 and 192 with spring 184 retained on spring tab 188 and held in place with rivet 186. The height of surface 202 is disposed in proximity as to cause an interference in upper notch 168 (See, FIG. 7) by the action of spring 184 thereby preventing removal of the retention device from the receiving member receptacle 142 (See FIG. 10).

FIG. 12A shows a rigid mounting body portion 201 with tab 212 capable of inserting through a slot 218 transecting the retention device 164. The rigid mounting body portion has a shaped end 211 with a circular aperture 213 suitable for attaching and securing a load. A first rigid mounting body portion is attachable to a second rigid mounting body portion by a fastening means such as a bolt 214 passing through an alignable aperture 216 in each rigid mounting body portion and fixed on the opposite side by a securing means such as a nut 215. FIG. 12B shows a rigid mounting body portion 221 with tab 222 capable of inserting through a slot 218 transecting the retention device 164. The rigid mounting body portion has a tab shaped end 232 capable of creating a closure when joined with a second so-shaped rigid mounting body portion, which is identical but in the opposite orientation. A ring 240 or D-loop 241 or other attachment unit may be inserted around the tab shaped end 232 so as to provide a suitable attaching means for securing a load. It is understood that any attachment device can be used in order to facility the securing of a load. The first rigid mounting body portion is attachable to a second rigid mounting body portion by a fastening means such as a bolt passing through an alignable aperture 230 in each rigid mounting body portion and fixed on the opposite side by a securing means such as a nut.

Figure 13C:
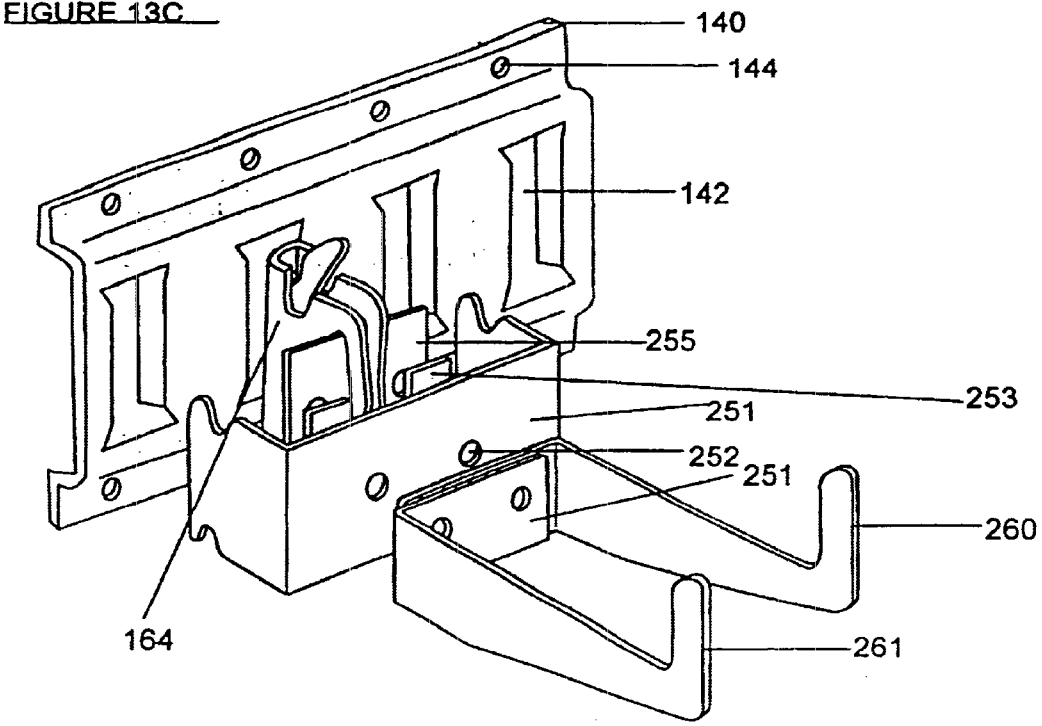
FIGS. 13A–13D. Assembly of storage device support member with assembly insertable into cargo control track and attachable to a load bearing arm.
Figure 13:
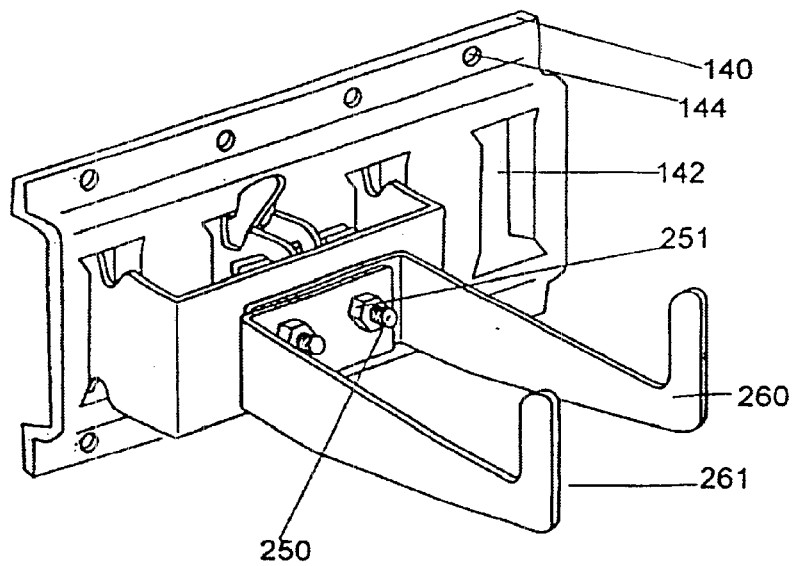
FIG. 13E. Cross sectional view of the assembled storage device support member.
Figure 13:
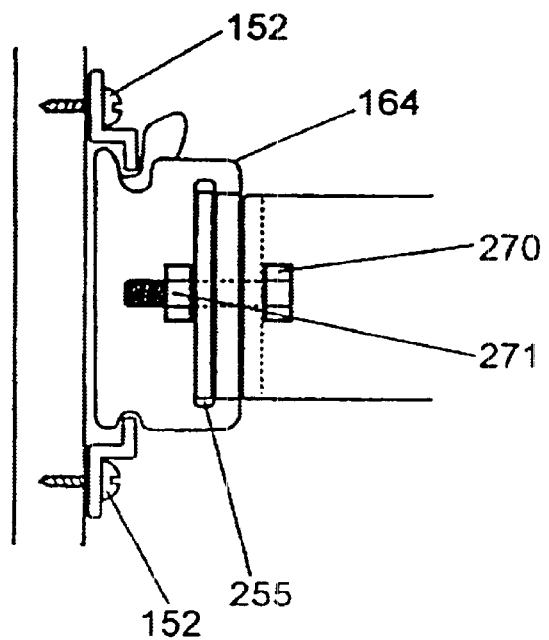

FIG. 13A shows a rigid mounting body 251 with alignable rigid mounting body apertures 252 and spacers 253 each with alignable spacer aperture 254. FIG. 13B shows a first rigid mounting body portion 251 aligned at the rigid mounting body portion apertures 251 with a pair of spacers 253 aligned at the spacer apertures 254 together with a second rigid mounting body portion 255 in the form of a flat plate inserted through the retention device and aligned at the second rigid mounting body portion apertures 258. A bracket-shaped load bearing arm 255 which is attachable to the rigid mounting body by a fastener means inserted through the load bearing arm apertures 256 which are alignable with the described rigid mounting body apertures. As shown in FIGS. 13C–13D, the storage device support member may be securely assembled by inserting a fastening means such as a nut 250 and bolt 251 through the device component alignable apertures. The entire assembly is insertable into cargo control track 140. In this example, the shaped rigid mounting body portion is attached to a pair of bracket-shaped load bearing arms 260 and 261. The spacers 253 provide additional stability. In this example, bracket-shaped load bearing arms which are overlapping mirror image forms provide additional stability. The cross sectional view shown in FIG. 13E demonstrates the inserted retention device 164 showing a rigid mounting body portion 255 transecting the retention device and secured through the alignable apertures by means of a nut 270 and a bolt 271.

Figure 14:
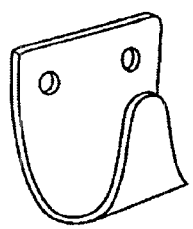
FIGS. 14A–14O. Various attachable and interchangeable load bearing arms.
Figure 14:
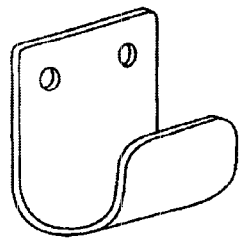
Figure 14:
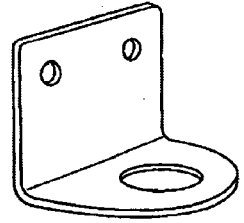
Figure 14:
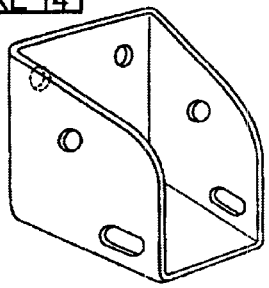
Figure 14:
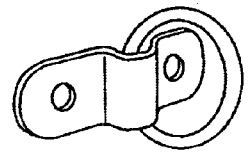
Figure 14:
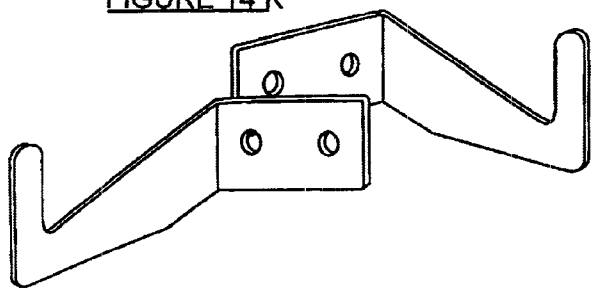
Figure 14:
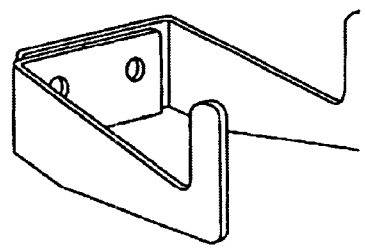
Figure 14:
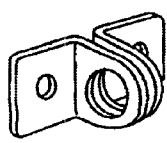
Figure 14:
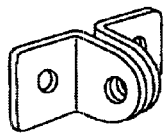
Figure 14:
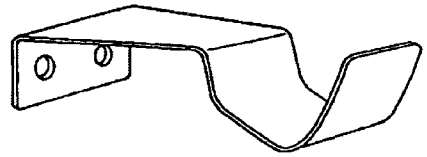

Numerous and various attachable and interchangeable load bearing arms, including hook shaped, bracket shaped, box shaped, integrated ring and detachable ring shaped portions are exemplified in FIGS. 14A–14O. It is specifically contemplated that clips or flexible closures may be used to hold a load securely, while enabling easy removal of the load.

Figure 15:
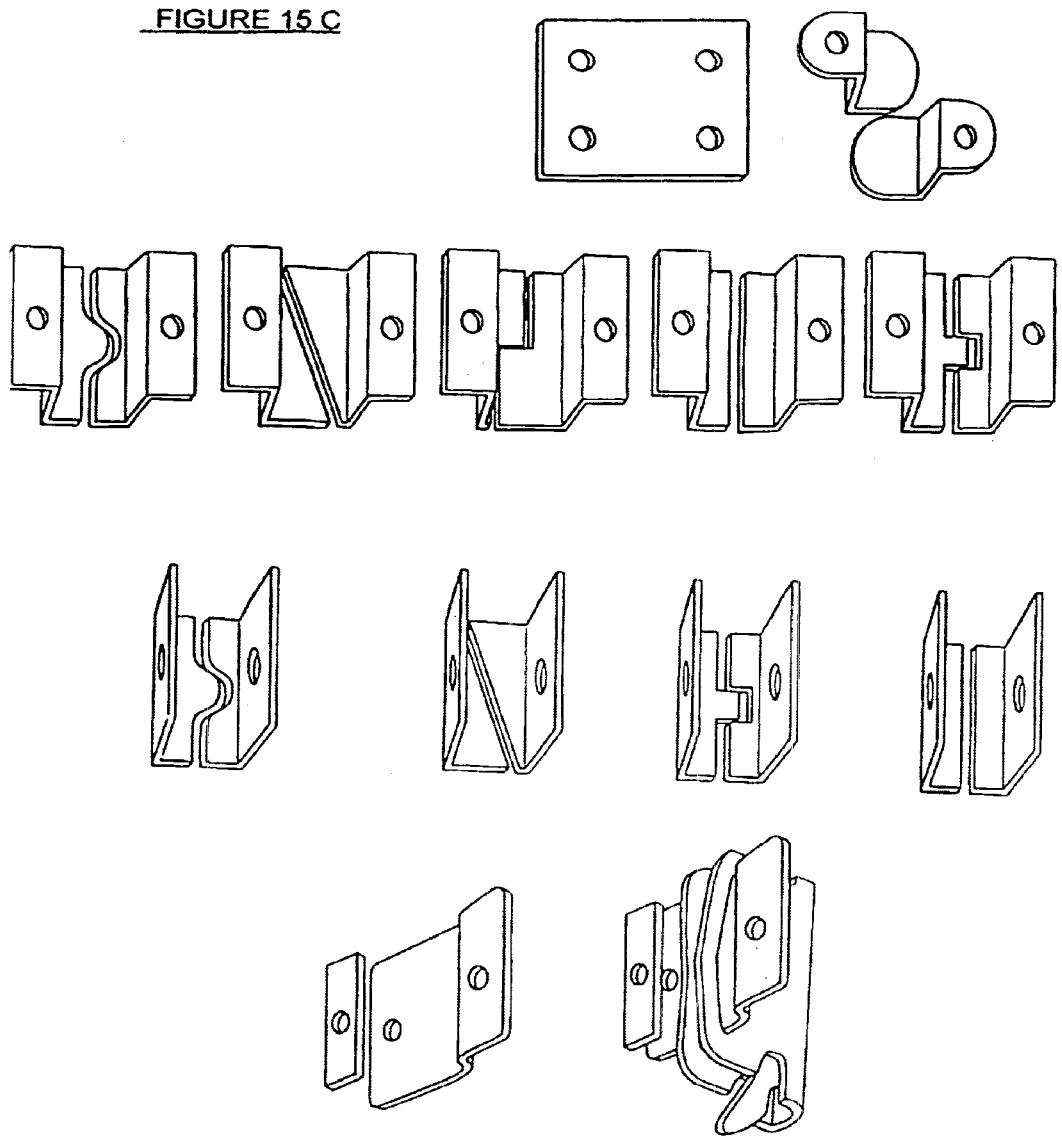
FIGS. 15A–B. Rigid mounting body portions.
FIG. 15C. Shaped rigid mounting body portions.

Similarly, numerous and various shaped rigid mounting body portions are exemplified in FIGS. 15A–15B. FIG. 15A shows a flat plate 401 capable of insertion through a retention device 164 with alignable apertures 403. Spacers 402 provide additional stability and can be joined to the rigid mounting body by inserting a fastener such as a bolt through a spacer aperture aligned with a corresponding rigid mounting body portion aperture. FIG. 15B shows shaped rigid mounting body portions with tabs suitable for insertion through retention device 164. Apertures are provided in various orientations. Spacers provide additional stability and may be provided in different shapes such as 430 or 432 and with apertures in various orientations such as 431 and 433. Use of multiple combinations of spacers and rigid mounting body portions are specifically contemplated. FIG. 15B shows rigid mounting body portions of varying shapes provided with flanges and apertures to facilitate attachment of interchangeable load bearing arms. Insertion tabs are also provided for insertion through a retention device. Spacers may be used to provide additional stability.

FIG. 16 exemplifies a rigid mounting body portion 500 in the form of a flat plate inserted through more than one retaining device 164. Insertion through multiple retaining devices provides additional stability. The assembly is shown inserted into cargo control track 142. FIG. 16B exemplifies various shaped rigid mounting body portions 501–504 each suitable for attachment as a second rigid mounting body portions to a first rigid mounting body portion 500 by securing a fastening means through the alignable apertures. A load bearing arm may also be attached to the assembly.

The present invention provides the advantage of combining the strength and economy of scale of cargo control track with the novel application of a plurality of interchangeable load support devices including but not limited to hooks and brackets, tension load support devices and overhead mounted hooks and brackets which utilizing a retention device, cooperate with the receiving member receptacles of the cargo control track and may include a positive retention latching device. The track or receiving member may be fastened by commonly known means, including but not limited to screws, bolts, welding, rivets, expansion anchor type, molly type or other suitable fastening methods.

According to the present invention, a storage system includes both horizontally and vertically oriented receiving member cargo control tracks which may be affixed to either a free-standing support structure or the internal support structure of a building, vehicle or other supporting structure such as a fence or a wall.

Throughout this application, various publications and patents and patent applications are referenced. The disclosures of these publications in their entireties are hereby incorporated by reference into this application in order to more fully describe the state of the art.

This invention may be embodied in other forms or carried out in other ways without departing from the spirit or essential characteristics thereof The present disclosure is therefore to be considered as in all respects illustrative and not restrictive, the scope of the invention being indicated by the appended Claims, and all changes which come within the meaning and range of equivalency are intended to be embraced therein.

I claim:

1. A storage device support member, comprising:
   a. at least one rigid mounting body portion comprising
      i. a shaped end of the rigid mounting body portion, capable of supporting a load, wherein the rigid mounting body portion is substantially solid,
      ii. a retention device attachment end of the rigid mounting body portion,
   b. a retention device removably attached, to the attachment end of the rigid mounting body portion, the retention device comprising
      i. a cargo control track insert, the insert having upper and lower notches which define at least one adjacent resilient finger which extends beyond the opposing edges of a receiving member receptacle
      ii. a positive engagement latch, movably mounted on the retention device, the positive engagement latch being movable between a notch blocking position and a release position, and
      iii. a positive engagement latch operating means, mounted on the retention device, capable of selectively enabling moving said positive engagement latch between the notch blocking position and the release position.

2. The storage device support member of claim 1, wherein the rigid mounting body portion further comprises an integral insertion tab, capable of insertion through the a cargo control track insert.

3. The storage device support member of claim 1, further comprising a second rigid mounting body portion, the second rigid mounting body portion being attached to the first rigid mounting body portion by means of a fastening device.

4. The storage device support member of claim 3, wherein the fastening device is a bolt.

5. The storage device support member of claim 1, further comprising at least one spacer, wherein the spacer is securely attached on a first spacer side to a first rigid mounting body portion, and on a second spacer side to a second rigid mounting body portion.

6. The storage device support member of claim 1, further comprising a load bearing arm, wherein the load bearing arm is securely attached to the rigid mounting body.

7. The storage device support member of claim 1, further comprising an attachment ring, wherein the attachment ring is a closed loop, substantially circular, securely attached to the rigid mounting body portion.

8. The storage device support member of claim 1, wherein the rigid mounting body comprises a two pronged hook shape capable of supporting a load.

9. The storage device support member of claim 1, wherein the rigid mounting body further comprises an elongated shaped end in a horizontal orientation, capable of supporting a cantilevered load.

10. The storage device support member of claim 1, wherein the rigid mounting body comprises a one pronged singular hook shape.

11. The storage device support member of claim 1, wherein the rigid mounting body comprises a linear shape capable of supporting a shelf bracket.

12. The storage device support member of claim 1 where the retention device is attached to an overhead cargo control track and the rigid mounting body portion is in a vertical orientation, capable of exerting a tension load.

13. The storage device support member of claim 1 wherein the rigid mounting body portion is in a shape capable of engaging and supporting a rim mounted tire.

14. The storage device support member of claim 1 where the rigid mounting body portion is a stationary rigid loop.

15. The storage device support member of claim 1 wherein the rigid mounting body portion is a ring.

16. The storage device support member of claim 1 wherein the rigid mounting body portion is a straight rod.

17. The storage device support member of claim 1 wherein the rigid mounting body portion is a flat plate.

18. The storage device support member of claim 1, further comprising stabilizing tabs that extend perpendicularly to the control track insert, capable of limiting pivotal movement of the rigid mounting body portion relative to the cargo control track, wherein the stabilizing tabs are securely attached to the rigid mounting body.

19. The storage device support member of claim 1 in combination with a rectangular receiving member receptacle, capable of stably and reversibly attaching to the provided retention device.

20. The storage device support member of claim 3, wherein the fastening device is a rivet.

21. The storage device support member of claim 3, wherein the fastening device is a screw.

22. The storage device support member of claim 3, wherein the fastening device is a dowel.

23. The storage device support member of claim 3, wherein the fastening device is a pin.

* * * * *